United States Patent [19]
Raad et al.

[11] Patent Number: 5,430,647
[45] Date of Patent: Jul. 4, 1995

[54] METHOD AND APPARATUS FOR MAINTAINING VEHICULAR RIDE HEIGHT

[75] Inventors: Joseph M. Raad, Southgate; Jon R. Watson, Redford; Geoffrey F. Bridges, Belleville, all of Mich.; David K. French, Newtown, Austria

[73] Assignee: Ford Motor Company, Dearborn, Mich.

[21] Appl. No.: 986,407

[22] Filed: Dec. 7, 1992

[51] Int. Cl.$^6$ .................................. B60G 17/00
[52] U.S. Cl. ........................ 364/424.05; 280/840; 280/707; 180/41
[58] Field of Search ............... 364/424.05, 424.01; 280/707, 703, 840, 6.1, 6.11, 688, DIG. 1, 772; 180/41

[56] References Cited

U.S. PATENT DOCUMENTS

| | | | |
|---|---|---|---|
| 4,568,096 | 2/1986 | Yew et al. | 280/6.1 |
| 4,648,621 | 3/1987 | Yokoya et al. | 364/424.05 |
| 4,659,104 | 4/1987 | Tanaka et al. | 280/707 |
| 4,685,689 | 8/1987 | Takizawa et al. | 280/707 |
| 4,693,485 | 9/1987 | Kamei et al. | 280/6 R |
| 4,700,303 | 10/1987 | Tokuyama et al. | 364/424.05 |
| 4,714,271 | 12/1987 | Buma et al. | 280/707 |
| 4,718,695 | 1/1988 | Kawagoe | 280/707 |
| 4,729,580 | 3/1988 | Buma et al. | 280/707 |
| 4,744,589 | 5/1988 | Buma et al. | 280/707 |
| 4,787,644 | 11/1988 | Yokote et al. | 280/6 R |
| 4,803,627 | 2/1989 | Yasuike et al. | 364/424.05 |
| 4,803,630 | 2/1989 | Takizawa et al. | 364/424.05 |
| 4,809,176 | 2/1989 | Oowa et al. | 280/707 |
| 4,829,436 | 5/1989 | Kowalik et al. | 364/424.05 |
| 4,856,798 | 8/1989 | Buma et al. | 280/6.11 |
| 4,869,528 | 9/1989 | Buma et al. | 280/707 |
| 4,887,840 | 12/1989 | Harara et al. | 280/707 |
| 4,903,209 | 2/1990 | Kaneko | 364/424.05 |
| 4,936,604 | 6/1990 | Kawagoe et al. | 280/840 |
| 4,948,166 | 8/1990 | Kaneko | 280/707 |
| 4,949,262 | 8/1990 | Buma et al. | 364/424.05 |
| 4,953,890 | 9/1990 | Kamimura | 280/707 |
| 4,965,878 | 10/1990 | Yamigiwa et al. | 364/424.05 |
| 4,966,387 | 10/1990 | White, IV | 280/712 |
| 4,971,360 | 11/1990 | Pischke et al. | 280/840 |
| 4,974,861 | 12/1990 | Itoh et al. | 280/6.1 |
| 4,980,830 | 12/1990 | Aoki et al. | 364/424.05 |
| 5,013,067 | 5/1991 | Mine et al. | 280/840 |
| 5,014,199 | 5/1991 | Konishi et al. | 364/424.05 |
| 5,046,754 | 9/1991 | Kimura et al. | 280/707 |
| 5,047,938 | 9/1991 | Yokote et al. | 364/424.05 |
| 5,053,965 | 10/1991 | Fujimura et al. | 364/424.05 |
| 5,058,017 | 10/1991 | Adachi et al. | 364/424.05 |
| 5,068,792 | 11/1991 | Lehr et al. | 364/424.05 |
| 5,083,275 | 1/1992 | Kawagoe et al. | 364/424.05 |
| 5,090,727 | 2/1992 | Kii et al. | 280/707 |
| 5,096,219 | 3/1992 | Hanson et al. | 280/707 |
| 5,130,927 | 7/1992 | Kunishima et al. | 364/424.05 |
| 5,144,558 | 9/1992 | Fukushima et al. | 364/424.05 |
| 5,184,841 | 2/1993 | Pischke et al. | 280/707 |
| 5,251,134 | 10/1993 | Takehara et al. | 364/424.05 |

FOREIGN PATENT DOCUMENTS 0299417 12/1987 Japan.

Primary Examiner—Kevin J. Teska
Assistant Examiner—Tan Nguyen
Attorney, Agent, or Firm—Roger L. May; Raymond L. Coppiellie

[57] ABSTRACT

Method and apparatus for maintaining vehicular ride height in a vehicle having a body, front and rear wheels and an air suspension including front and rear air springs. The method includes sensing vehicle body height relative to the wheels to obtain front and rear vehicle height signals, and sensing vehicle speed to obtain a vehicle speed signal. The method also includes processing the front height signals to obtain a vehicle roll signal that has been compensated for the natural lean of the vehicle, the vehicle roll signal indicating vehicle roll due to steering adjustments by the vehicle operator. The method further includes processing the vehicle speed signal to obtain a vehicle pitch offset signal, indicating vehicle body height change due to longitudinal vehicle acceleration. The method also includes adjusting the height of the vehicle toward a predetermined target ride height based on the vehicle height sensor signals which have been compensated for vehicle roll and pitch.

19 Claims, 9 Drawing Sheets

METHOD AND APPARATUS FOR MAINTAINING VEHICULAR RIDE HEIGHT

TECHNICAL FIELD

The present invention relates to vehicular air suspensions and, more particularly, to a method and apparatus for maintaining vehicular ride height.

BACKGROUND ART

In recent years, conventional automotive suspensions have been modified to include inflatable and deflatable air springs. These suspensions, frequently referred to as air suspensions, are typically under electronic control and maintain a predetermined vehicle ride height relative to the wheels, regardless of fluctuations in the passenger/cargo weight. By maintaining ride height, fully loaded vehicles, or vehicles having uneven weight distributions, benefit from improved outward appearances, ride and improved handling.

For example, U.S. Pat. No. 5,083,275, issued to Kawagoe et al., discloses a height control system for an automotive suspension system with the vehicle driving condition dependent on variable target height. The vehicle height control system includes a suspension system which includes means for varying suspension force, a first sensor monitoring a vehicular height for producing height indicative for a sensor signal, a second sensor monitoring a vehicular driving condition to produce a vehicular driving condition indicative second sensor signal and a control means for receiving the first sensor signal. The control means checks the value of the sensor signal with respect to a predetermined target height range indicative values for deriving a control signal to operate the varying means to adjust the suspension for maintaining the vehicular height within the target height range. The control means defines the target height range in relation to a predetermined target height with a given acceptable height deviation from the target height, which acceptable deviation is variable depending upon the vehicle driving condition represented by the second sensor signal.

Existing air suspension systems either inhibit height corrections during acceleration (both positive and negative), or allow inaccurate corrections during accelerations, both positive and negative.

SUMMARY OF THE INVENTION

It is an object of the present invention to provide an improved method of controlling a vehicular air suspension.

It is an object of the present invention to provide a method for accurately adjusting vehicle ride height while under a roll condition and under longitudinal acceleration.

In carrying out the above object and other objects and features of the present invention, a method is provided for controlling vehicle ride height for use with a vehicle travelling on a road surface, the vehicle having a body, front and rear wheels and an air suspension. The method comprises (a) sensing vehicle body height relative to the wheels to obtain front and rear vehicle height signals, and sensing vehicle speed to obtain a vehicle speed signal, and (b) determining the natural lean of the vehicle based on the front height signals. The method also comprises (c) processing the front height signals to obtain a vehicle roll signal that has been compensated for the natural lean of the vehicle, the vehicle roll signal indicating vehicle roll due to steering adjustments by the vehicle operator, and (d) processing the vehicle speed signal to obtain a vehicle pitch offset signal, the vehicle pitch offset signal indicating vehicle height change due to vehicle longitudinal accelerations. The method also comprises (e) adjusting the height of the vehicle toward a predetermined target ride height based on the height signals, the vehicle roll signal and the vehicle pitch offset signal, the vehicle roll signal and the vehicle pitch offset signal being utilized to increase the accuracy of vehicle height adjustments.

A system is also provided for carrying out the method.

The advantages accruing to the present invention are numerous. For example, although a vehicle roll offset is determined prior to making ride height corrections, the corrections are inhibited while the vehicle is under excessive roll, minimizing inaccurate ride height corrections. Were these corrections allowed, objectionable steering pull would accompany them, and the subsequent re-corrections would increase system duty cycle. Additionally, accurate ride height corrections are possible even when the vehicle is experiencing longitudinal accelerations.

The above objects and other objects, features, and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
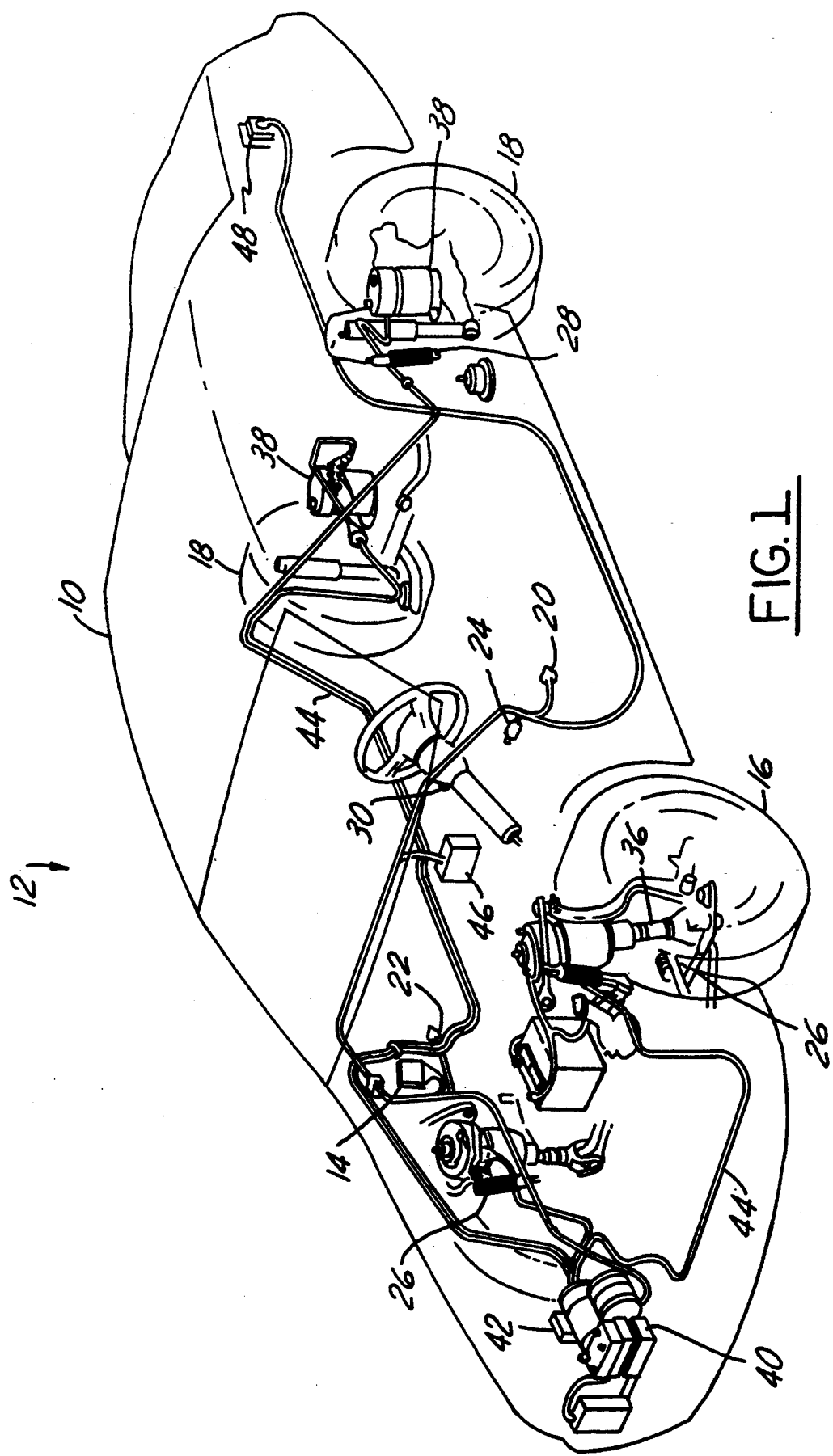
FIG. 1 is a perspective view of a vehicle, with the body shown in outline, including front and rear air suspensions for use with the present invention.
Figure 2:
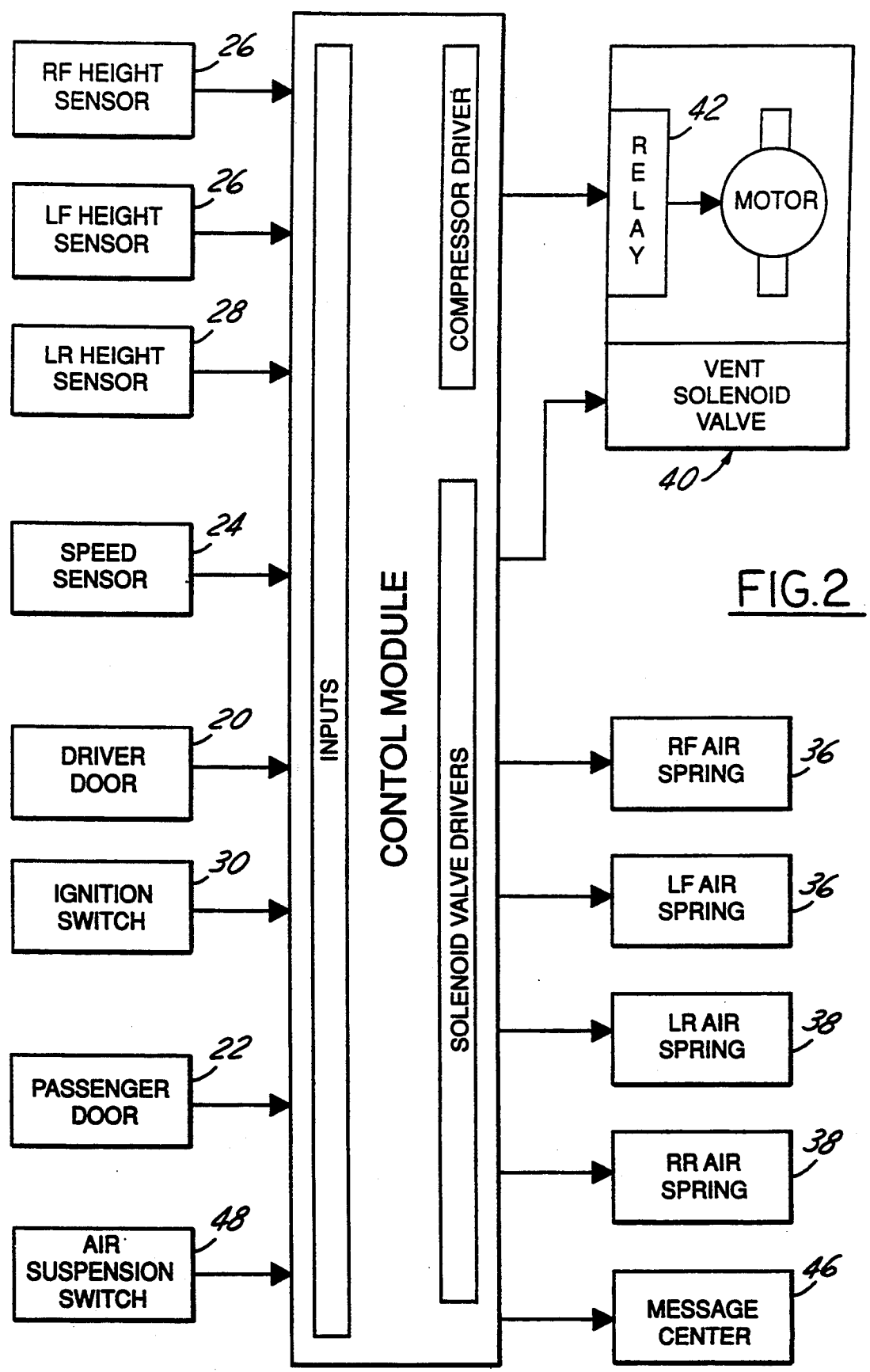
FIG. 2 is a block diagram illustrating the inputs to and outputs of the air suspension electronic control module shown in FIG. 1.

Referring now to FIG. 1, there is shown a vehicle, with the body 10 shown in outline, including an air suspension system shown generally by reference numeral 12. As shown, the air suspension system 12 includes an air suspension electronic control module (ECM) 14 which continuously maintains the height position of the vehicle body 10 relative to the front wheels 16 and the rear wheels 18, based on sensory information collected from the driver door sensor 20, the passenger door sensor 22, a vehicle speed sensor 24, the front height sensors 26, the rear height sensor 28 and the ignition switch 30. A block diagram of the air suspension system ECM 14 is shown in FIG. 2, illustrating the inputs provided to and the outputs generated by the ECM. The air suspension system maintains a predetermined trim height, regardless of road conditions and passenger load. In the preferred embodiment, the system 12 compensates for changes in vehicle load conditions by measuring, evaluating and reacting to changes in front body and rear sub-frame locations relative to the front wheels 16 and the rear wheels 18.

As best shown in FIG. 1, the front height sensors 26 are analog height sensors, and are mounted on ball studs located on the front upper arms and the front outer frame rails, just inboard of the front wheels 16. A single rear height sensor 28 is preferably mounted on ball studs located on the left rear lower arm and the sub-frame thereabove. The front and rear height sensors 26 and 28 send continuous voltage signals, which correspond to the position of the vehicle body 10 relative to the front and rear wheels, to the air suspension electronic control module 14.

As shown in FIG. 1, the air suspension system 12 also includes front air spring assemblies 36 and rear air springs 38. Each front air spring assembly 36 includes a front shock absorber, with the top of the air spring mounted directly into the vehicle body 10. The rear air springs 38 are independent of the rear shock absorbers.

As shown in FIGS. 1 and 2, the air suspension system 12 also includes an air compressor assembly shown generally by reference numeral 40. The air compressor assembly includes a motor controlled by the air suspension electronic control module 14 through a solid state relay 42. The air compressor assembly 40 also includes a vent solenoid valve not specifically illustrated, which allows the vehicle to be lowered during air spring venting activities, and is controlled directly by the control module 14. Additionally, the air compressor assembly 40 includes an air dryer which contains a desiccant to dry the compressed air before delivery to the front air spring assemblies 36 and rear air springs 38. The air suspension system also includes a plurality of pneumatic valves located at proximate each wheel for receiving or releasing air, and controlled by the air suspension module 14.

Air flows from the air compressor 40 to each of the four air springs through nylon air lines 44. Airflow into and out of each of the front air spring assemblies 36 and rear air springs 38 is controlled by pneumatic valves not specifically illustrated, into which each air line 44 is connected. Preferably, the front valves employ an internal filter to keep shock absorber fluid out of the system and the rear valves include a simple screen.

A message center, shown generally by reference number 46 in FIG. 1, provides information to the vehicle operator. This information is provided to the operator in the form of messages, which indicate the status of the air suspension system, and the status of the air suspension switch 48 located in the trunk of the vehicle. The air suspension switch 48 allows the vehicle operator to deactivate operation of the air suspension system 12 for jacking, hoisting and towing.

Figure 3:
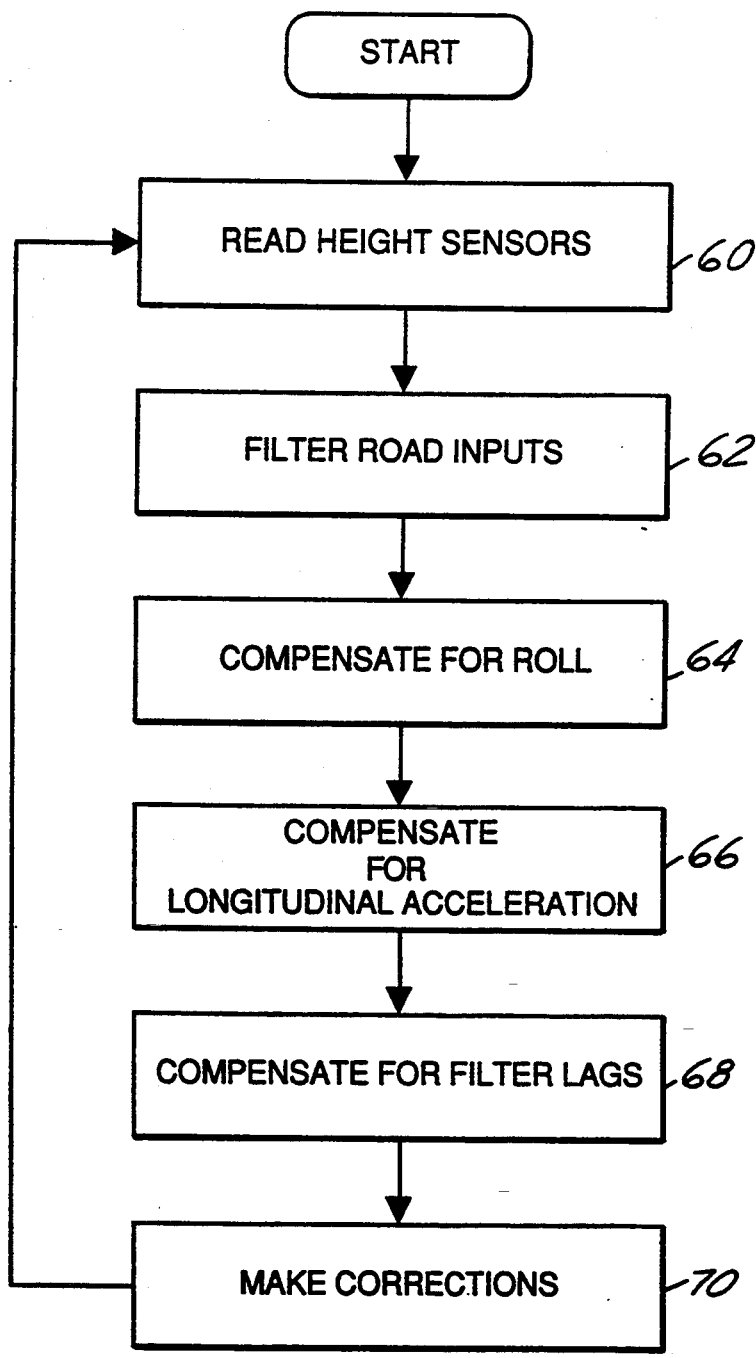
FIG. 3 is a flow chart detailing the steps for maintaining vehicle ride height of the present invention.

Referring now to FIG. 3, there is shown a flow chart detailing the steps for maintaining vehicle ride height during vehicle roll, longitudinal acceleration and varying conditions, of the present invention. As shown, at step 60 the air suspension electronic control module 14 reads data from the front height sensors 26 and the rear height sensor 28. In the preferred embodiment, the height sensors send continuous voltage signals to the module 14, the signals corresponding to the position of the vehicle body relative to the front and rear wheels.

With continuing reference to FIG. 3, at step 62, the control module 14 filters the vertical component of the vehicle body motion from the height sensor signals. The vertical component, also referred to herein as road inputs, is due primarily to wheel hop and road undulations. As the vehicle travels over a road surface, the front wheels 16 and rear wheels 18 are set into a translating motion (i.e. up and down) due to potholes and other variations in the road surface. As a result, the vehicle body is set into similar translating motion, although at a lower frequency. Generally, the wheel hop has a frequency of about 12–13 Hz and the vehicle body motion has a frequency of about 1 Hz. Since the height sensors are mounted between the vehicle body and the wheels, both types of motion are detected by the front and rear height sensors, resulting in about a 1 Hz height sensor signal with a 12–13 Hz signal superimposed thereon.

Figure 4:
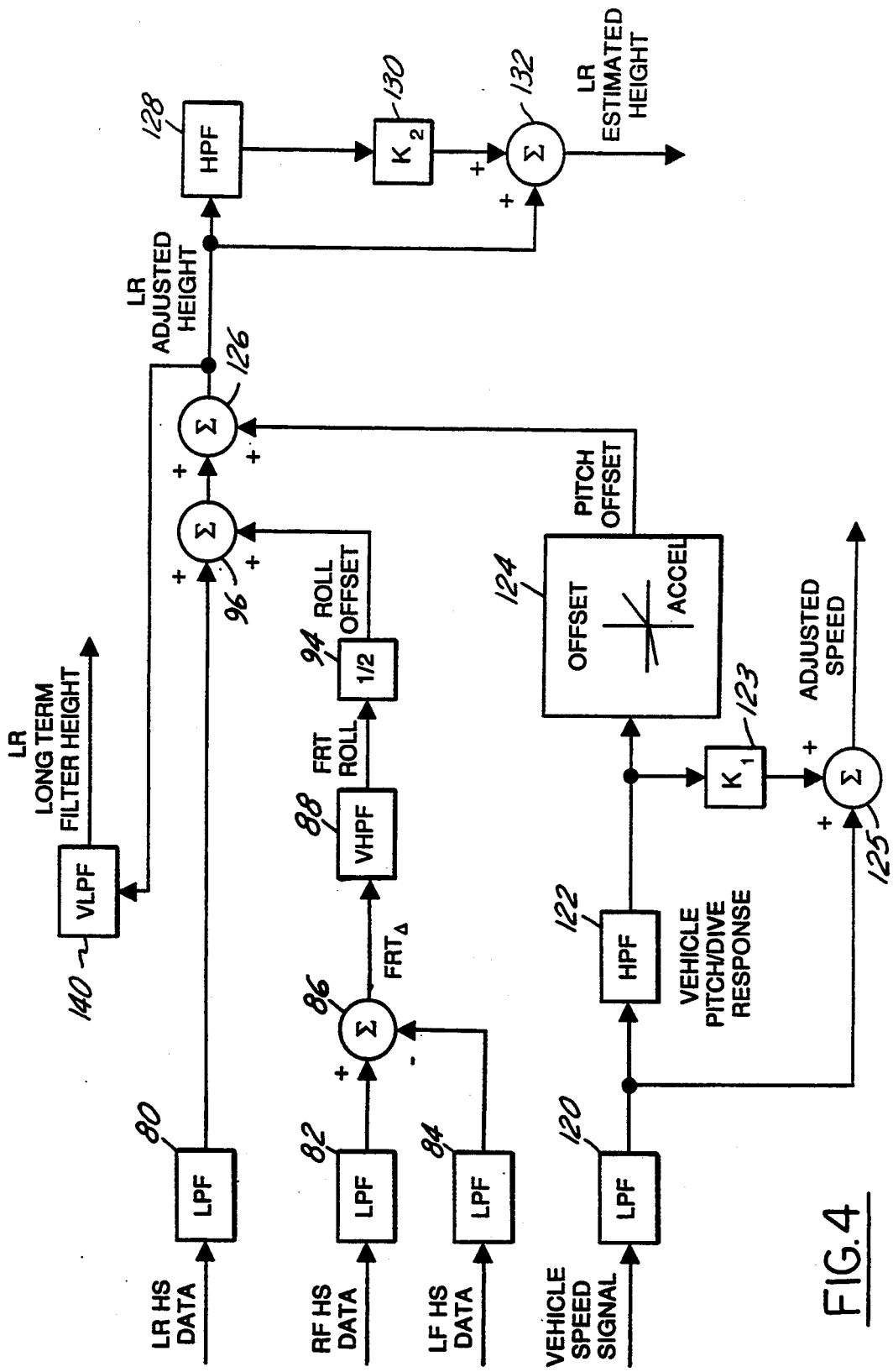
FIG. 4 is a block diagram illustrating implementation of the method of the present invention.

With additional reference to FIG. 4, there is shown a control diagram illustrating how the steps of the flow chart shown in FIG. 3 are implemented. To filter out the road inputs, a height sensor signal is applied to a low pass filter (LPF) 80 to obtain a filtered height signal. For purposes of this discussion, the left rear height sensor signal is the only input to the LPF 80 shown, although height sensor signals from both front height sensors are also processed for road inputs by similar low pass filters not shown for the sake of clarity. Preferably, the low pass filter 80 is a second order filter that is digitally implemented in software and has a time constant ($\tau$) of about 2 seconds. The filtered height signal from the low pass filter represents a height signal with road inputs removed.

As shown in FIG. 3, after the road inputs have been removed, at step 64 the vehicle body roll is determined and compensated for. Vehicle roll, or side-to-side motion of the vehicle body, generally results from steering adjustments made by the vehicle operator. In the preferred embodiment, no corrections (venting/pumping) to the vehicle height are made during excessive vehicle roll, to ensure maintaining an accurate vehicle height. To accurately detect roll, a quasi-steady-state "natural lean" of the vehicle is preferably determined, as described in greater detail below. As used here, natural lean is defined to mean that both front sensor signals are within their trim bands, but one side of the vehicle is higher or lower than the other. This occurs when changing lanes, or when the vehicle is travelling on road with a high crown, or when completing a levelling correction when the vehicle is in a slight turn. These types of conditions often occur and the natural lean must be compensated for in order to accurately determine transient roll, due, for example, to steering corrections made by the vehicle operator. This difference between the left and right sides, also referred to herein as the DC offset, manifests itself as a quasi-steady-state difference in height sensor signals, unlike vehicle roll, which manifests itself by a transient in the height sensor signals due to a change in direction of the vehicle (i.e. a steering adjustment). If DC offset is not determined, and only the differences in the front height sensors are used to detect roll, large inaccuracies will occur in the determination of roll. These inaccuracies will result in some conditions allowing corrections to occur when they should be inhibited, and vice versa.

As shown in FIG. 4, right front height sensor (RFHS) and left front height sensor (LFHS) data signals are first applied to low pass filters (LPF) 82 and 84, respectively, to filter out road inputs and obtain filtered height signals. Filters 82 and 84 are substantially similar to the LPF 80 discussed above, i.e., they are digitally implemented second order filters having a 2 second time constant for filtering out road inputs. The right front and left front filtered height signals are then applied to a summer 86 which, as shown, actually determines the difference ($FRT_\Delta$) between the right front filtered height sensor signal and the left front filtered height sensor signal. In the preferred embodiment, a positive valued $FRT_\Delta$ is generally indicative of the right side of the vehicle being higher than the left side of the vehicle. Similarly, a negative valued $FRT_\Delta$ is generally indicative of the left side of the vehicle being higher than the right side of the vehicle.

Figure 5:
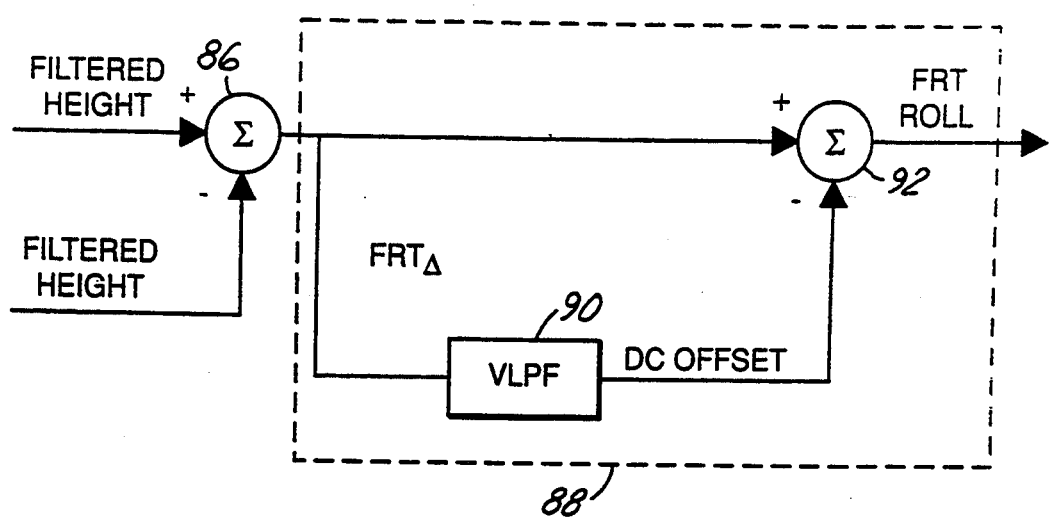
FIG. 5 is a block diagram illustrating implementation of the variable high pass filter 88 shown in FIG. 4.

The $FRT_\Delta$ signal is applied to a variable high pass filter (VHPF) shown generally by reference numeral 88 in FIG. 4 to obtain a front vehicle roll signal ($FRT_{ROLL}$). Depending on the vehicle speed, the natural lean, or DC offset, is utilized to accurately determine $FRT_{ROLL}$, as shown in FIG. 5. The $FRT_\Delta$ signal from the summer 86 is applied to a variable low pass filter (VLPF) 90, the output of which represents the natural lean, or DC offset, of the vehicle. The DC offset output from the VLPF 90 is then combined with the $FRT_\Delta$ signal by the summer 92, to obtain the $FRT_{ROLL}$ signal. In the preferred embodiment, the time constant $\tau$ of the VLPF 90 is varied to set the drift rate of the filter to an appropriate value. For a vehicle speed of 0 MPH, DC offset is generally not considered and the VHPF 88 is not updated. For vehicle speeds between 0 and 5 MPH, the time constant of the VLPF 90 is short, such as 1 second, since at these speeds significant vehicle roll is not probable. For vehicle speeds above 5 MPH, the time constant of the VHPF 88 has three values, depending on certain conditions, as shown in FIG. 6.

Figure 6:
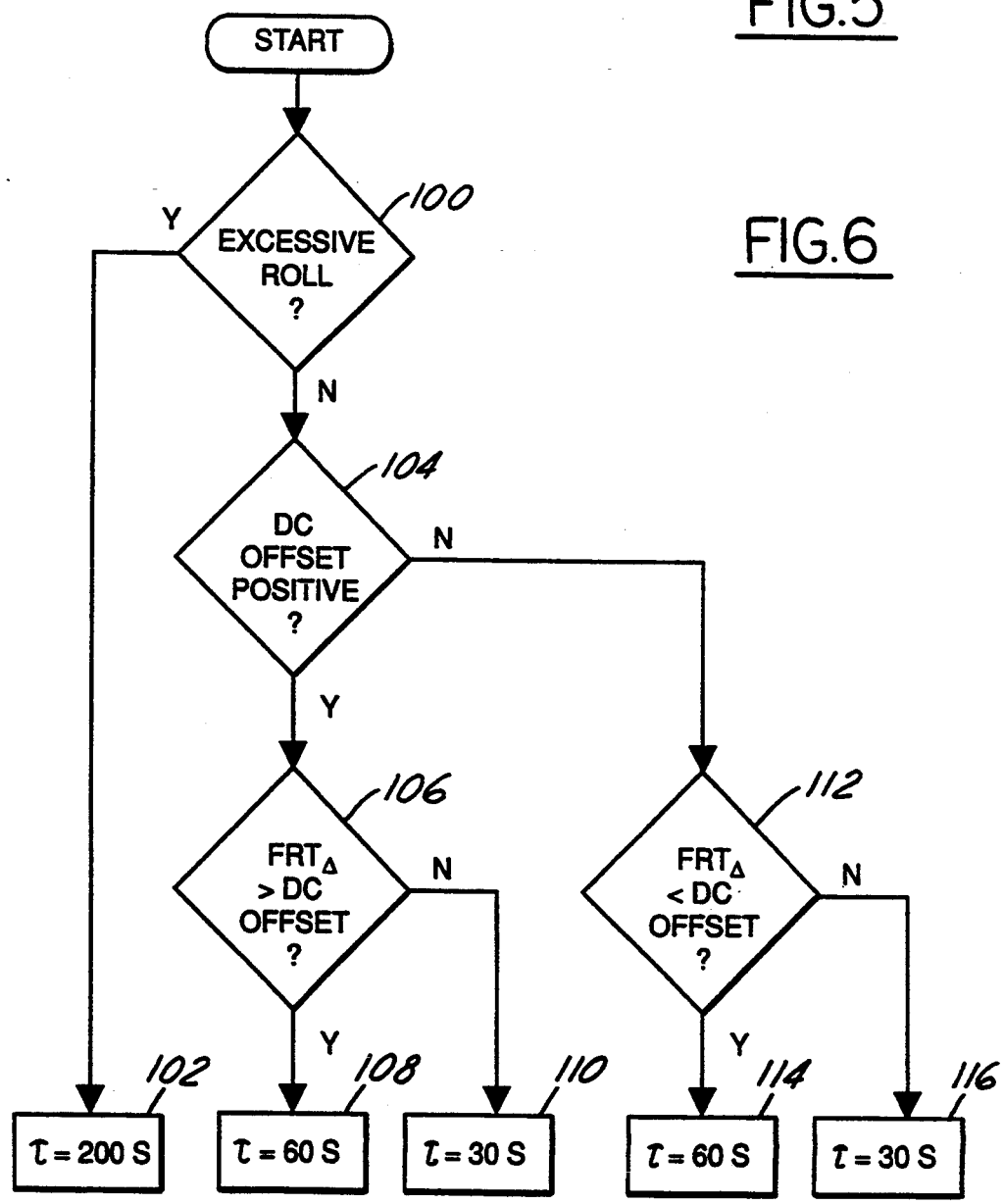
FIG. 6 is a flow chart detailing the steps for determining the time constant of the variable low pass filter shown in FIG. 5.

Referring now to FIG. 6, there is shown a flow chart detailing selection of the time constant for the VLPF 90, based on roll and DC offset. Generally, if DC offset is increasing, such as when the vehicle is executing a long turn, the time constant is increased, slowing the drift rate. If, however, the DC offset is decreasing, such as when the vehicle is leaving a corner, the time constant is decreased, speeding up the drift rate.

Figure 7:
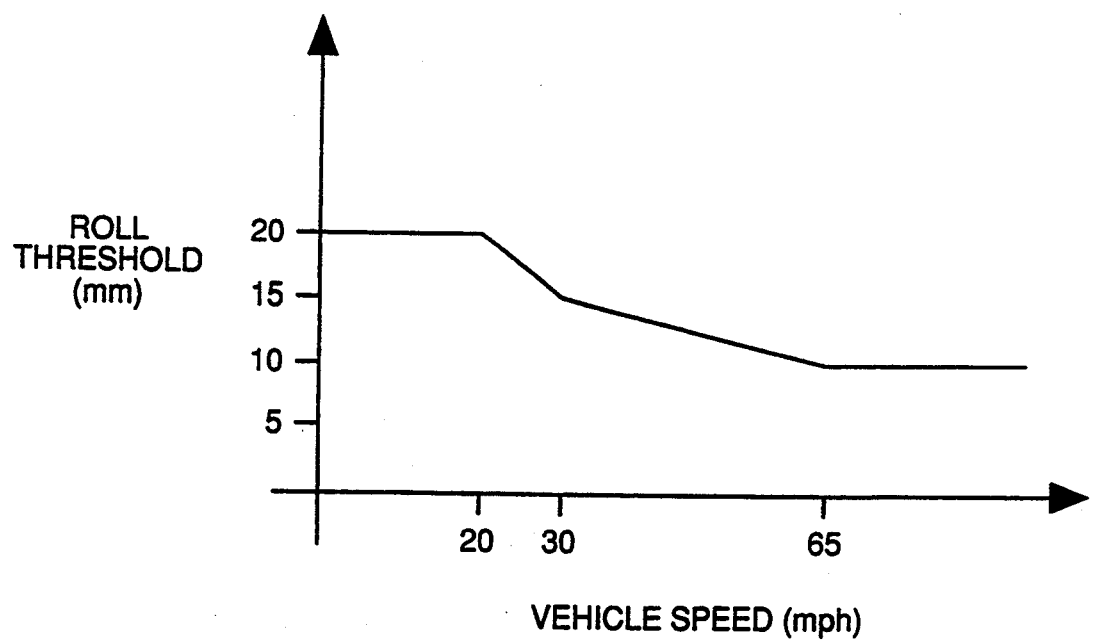
FIG. 7 is a graphical illustration of the relationship between the roll threshold and vehicle speed, for use with the present invention.

As shown in FIG. 6, at step 100 the microcontroller determines whether the vehicle is under excessive roll, which is detected utilizing a roll threshold. With reference now to FIG. 7, the relationship between roll threshold and vehicle speed is shown graphically. When $FRT_{ROLL}$ exceeds the roll threshold, the vehicle is considered to be in excessive roll, and suspension levelling corrections are inhibited. As shown in FIG. 6, if the vehicle is in roll, at step 102 the time constant of the VLPF 90 is modified to a very large value, such as 200 seconds. This has the effect of delaying updates so that the DC offset does not closely track $FRT_\Delta$. If the time constant is too large, however, the VHPF 88 will not generate as accurate an indication of vehicle roll. Once the $FRT_{ROLL}$ drops below the roll threshold, there is a time delay of about 4 seconds which preferably expires prior to ride height corrections being made. This delay prevents on/off cycling of the suspension system, which might occur due to corrections being made on a straight road surface between corners.

With continuing reference to FIG. 6, at step 104 the microcontroller determines whether the present value of DC offset is positive or negative. If the DC offset is positive, at step 106 the value of $FRT_\Delta$ is compared to the value of the DC offset. Based on that comparison, the time constant $\tau$ of the VLPF 90 is assigned a value of 60 seconds or 30 seconds at steps 108 and 110, respectively. If the DC offset is negative, at step 112 the value of $FRT_\Delta$ is compared to the value of the DC offset. Based on that comparison, the time constant is assigned a value of 60 seconds or 30 seconds at steps 114 and 116, respectively. It should be appreciated to one of ordinary skill in the art that this implementation results in slowing the rate of increase in the DC offset when the vehicle is going around a corner, and speeding up the rate of decrease in the DC offset when the vehicle is travelling straight after coming out of a corner.

With continuing reference to FIG. 6, the following example will illustrate the advantage gained by establishing the natural lean and utilizing it to accurately detect vehicle roll. If the DC offset has a value of 10 mm, and $FRT_\Delta$ has a value of 13 mm, the microcontroller will try to track the difference and the DC offset will increase toward 13 mm. It is desirable to slow the rate of increase of the DC offset value to the higher value. By varying the time constant of the filter, the microcontroller decreases the tendency of the DC offset to stray from, and increases the tendency to return toward, the quasi-steady-state natural lean. As a result, a very precise value for vehicle roll ($FRT_{ROLL}$) is obtained.

Returning now to FIG. 4, the accurate indication of vehicle roll output from the VHPF 88 is then halved by a divider 94, to obtain a roll offset applicable to each front wheel. As shown, the roll offset is then combined with the filtered height signal output from the LPF 80. For the left rear and left front filtered height signals output from the LPF 80, the roll offset is added thereto by the summer 96, whereas the roll offset is subtracted from the right front filtered signal output from the LPF 80. The output of the summer 96 is a vehicle height signal that has been filtered for road inputs and compensated for steering inputs.

Referring once again to FIG. 3, after having filtered for road inputs and compensated for steering inputs, at step 66 the microcontroller compensates for longitudinal accelerations (positive and negative). Generally, the longitudinal component represents fore and aft, or pitch, body motion caused primarily by vehicle acceleration and braking. For example, when the vehicle operator depresses the accelerator, the front end of the vehicle rises and the rear end of the vehicle lowers. When, however, the vehicle operator depresses the brake pedal, the front end of the vehicle dives and the rear of the vehicle rises.

As shown in FIG. 4, to filter the longitudinal component, the vehicle speed signal from the vehicle speed sensor 24 is first applied to a low pass filter (LPF) 120. The LPF 120 is substantially similar to the filters 80, 82 and 84, and introduces a lag to the vehicle speed signal similar to the lags introduced to the height signals due to filtering road inputs.

The filtered speed signal is then applied to a high pass filter (HPF) 122. The HPF 122 takes the derivative of the filtered speed signal and outputs a corresponding vehicle acceleration signal. In the preferred embodiment, the HPF 122 includes the vehicle pitch response characteristics. In the preferred embodiment, the HPF 122 includes a high pass filter which performs a derivative function to determine vehicle acceleration, and a low pass filter which represents the vehicle dynamic pitch response that represents the pitch natural frequency. The vehicle acceleration signal is then applied to block 124, which determines vehicle pitch offset. This is obtained from the vehicle acceleration multiplied by the corresponding gains, one of which is shown graphically in block 124. In the preferred embodiment, the gains are a function of the sign of the acceleration (i.e. positive or negative) and the end of the vehicle (i.e. front or rear). The output of block 124 is the vehicle pitch offset signal, which represents the change in vehicle height caused by longitudinal accelerations. Thus, if a vehicle is under longitudinal acceleration, the amount of front and rear height change due to that acceleration is determined as an offset. If the vehicle is under positive acceleration, the front offset is subtracted from the front height sensor signals and the rear offset is added to the rear height sensor signal, and the height signal upon which a correction is based represents a truer indication of vehicle height. If the vehicle is under negative acceleration, the front offset is added to the front height sensor signals and the rear offset is subtracted from the rear height sensor signal, and the height signal upon which a correction is based represents a truer indication of vehicle height. As a result, if a height correction is made while the vehicle is under longitudinal acceleration, the correction will be accurate and re-correction after acceleration is not necessary. Alternatively, a nonlinear gain could be implemented in block 124 to account for spring rate, suspension geometry, vehicle aerodynamics and other nonlinearities.

As shown in FIG. 4, the pitch offset signal is then combined with the signal output from the summer 96 to obtain an adjusted height signal. The pitch offset signal is substantially in phase with the signal output from the summer 96 due to lags introduced by the LPF 120. For the left rear filtered height signal, the pitch offset is added thereto by the summer 126, whereas the pitch offset is subtracted from the left and right front filtered height signals. The output of the summer 126 is the adjusted height signal, which represents the true height of the vehicle body relative to the wheels, compensated for vehicle roll and pitch and with road inputs removed. This signal is utilized to initiate corrections under certain conditions, as described in greater detail below.

With combined reference to FIGS. 3 and 4, compensation for the inherent filter lag in the adjusted height signal is accomplished at step 68 by a high pass filter (HPF) shown generally by reference numeral 128. The output of the HPF 128 is the slope, or rate of change ($\Delta H/\Delta T$), of the adjusted height signal. The height rate signal is then multiplied by a constant $K_2$ at block 130, which represents the time lag introduced to the adjusted height signal from the low pass filter 80, to obtain a change in vehicle height signal ($\Delta H$). $K_2$ is constant because the LPF 80 is a second order filter, which imparts a constant lag for a ramp input, which represents the output of the height sensors during a correction. The adjusted height signal from the summer 126 is then combined with $\Delta H$ by summer 132 to obtain the estimated vehicle height signal, which is utilized only during a correction to detect reaching the target height and to end the correction, as described in greater detail below.

Figure 8:
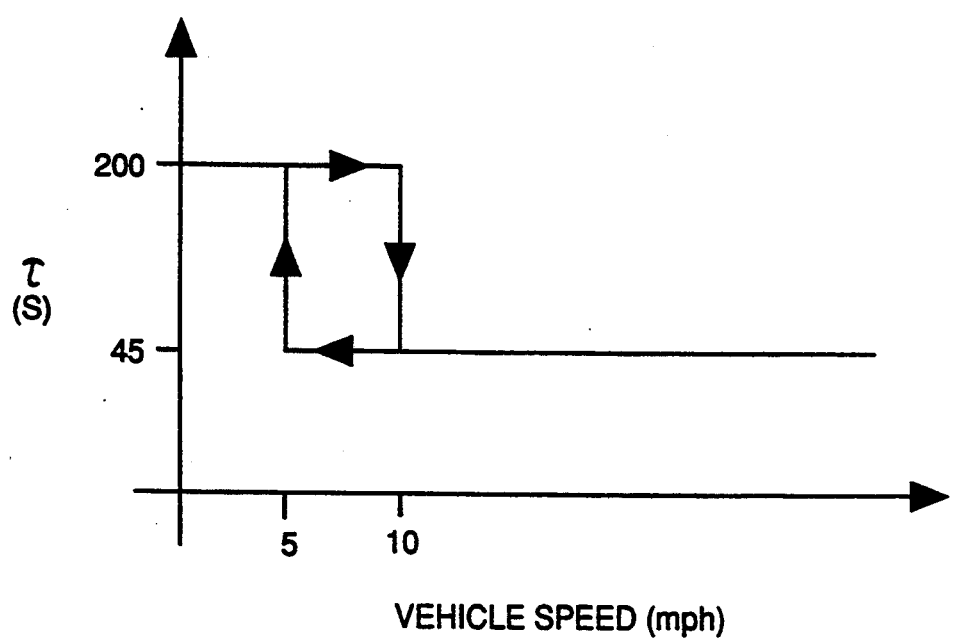
FIG. 8 is a graphical illustration of the relationship between the filter time constant and vehicle speed, for use with the present invention.

As shown in FIG. 4, the adjusted height signal output from the summer 126 is also applied to a variable low pass filter (VLPF), or long term filter, shown generally by reference numeral 140. The time constant of the filter 140 is the element that is varied based on vehicle speed. The variable time constant ($\tau$) is shown graphically in FIG. 8. As shown, at low vehicle speeds, such as less than 10 MPH, the time constant has a value of about 200 seconds. As the vehicle speed exceeds 10 MPH, the time constant changes to a value of about 45 seconds. As the vehicle speed decreases, the time constant does not return to 200 seconds until about 5 mph. Thus, the time constant is varied according to a 5 mph hysteresis band. This has the effect of delaying filter updates at low vehicle speeds, so as to prevent improper vehicle height corrections. For example, when a vehicle slows to a stop, the road surface could be uneven. Additionally, as the vehicle slows to a stop, such as at a traffic light, the front end dives and the rear end rises. As the independent front and rear suspensions move, the tire tread width also changes. Due to this tread width change, lateral tire stiffness, suspension friction, brake torque and the like, the front end tends to stay low and the rear end tends to stay high until the vehicle begins to roll from the stopped position. Uneven road surfaces, stopping, and the like adversely affect the accuracy of the height sensor signals as a true indicator of a need for vehicle height adjustments. The higher time constant delays filter adjustment, thereby delaying a height correction being made while the vehicle is at a traffic light, or a stop sign based on adversely affected height sensor signals. This avoids the use of a brake sensing device, reducing the cost and improving the reliability of the air suspension system. The output of the VLPF 140 is the long term filtered height signal, which is utilized to start vehicle height corrections, as described in greater detail below.

Referring once again to FIG. 4, the vehicle acceleration signal from the HPF 122 is multiplied by a constant $K_1$ at block 123, the value of which represents the lag of LPF 120, to obtain a change in vehicle velocity signal, $\Delta V$. The filtered speed signal from the LPF 120 is combined with the $\Delta V$ signal at the summer 125, to obtain an adjusted speed signal. In the preferred embodiment, the adjusted speed signal is utilized for determining the operating state of the vehicle (i.e. stopped, suburban driving or expressway driving) and for determining automatic speed levelling of the vehicle at high speeds, as described in greater detail below. It should be appreciated that this essentially eliminates the phase lag induced by filtering the speed signal. This is significant, and if not corrected, will lead to the suspension lowering at 85 mph instead of at 65 mph under heavy acceleration. The speed signal is preferably filtered to eliminate noise. The end result is increased accuracy with which ride height adjustments are made and reduced time required to initiate the adjustments.

Figure 9:
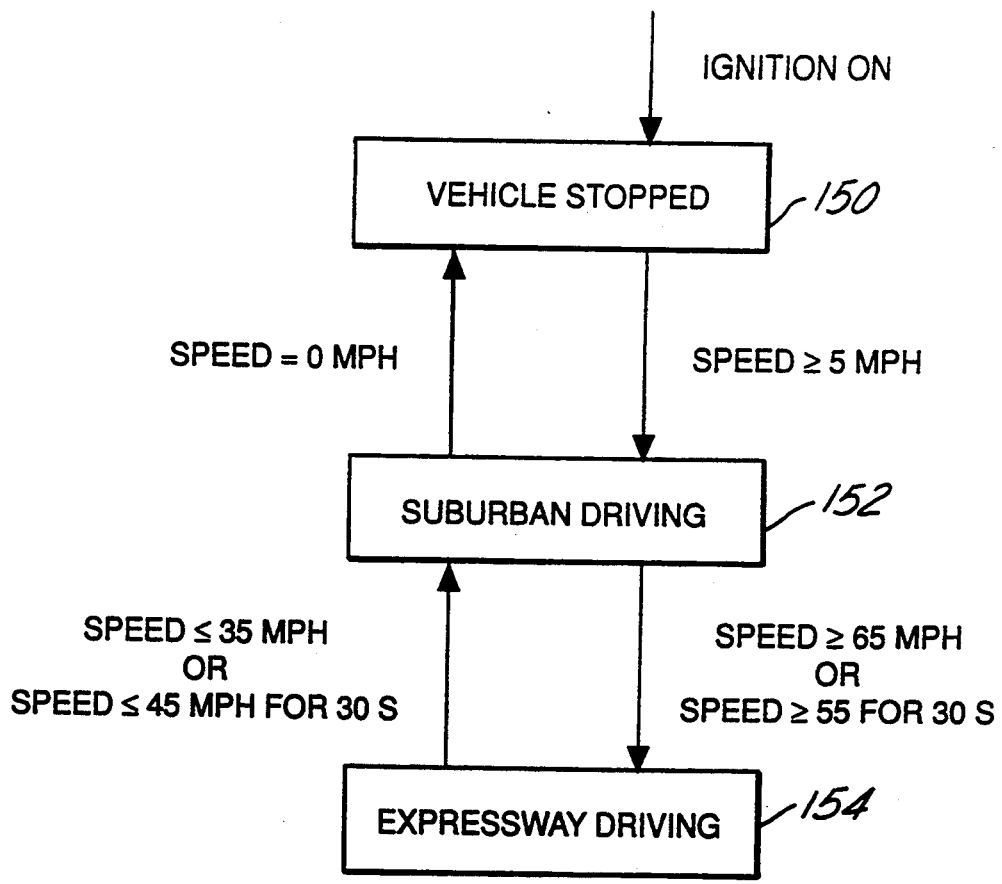
FIG. 9 is a state transition diagram, illustrating the operating states of the vehicle and the conditions for transition therebetween, the operating state determining the value of the target vehicle height, trim band and overshoot constants utilized by the present invention.
Figure 10:
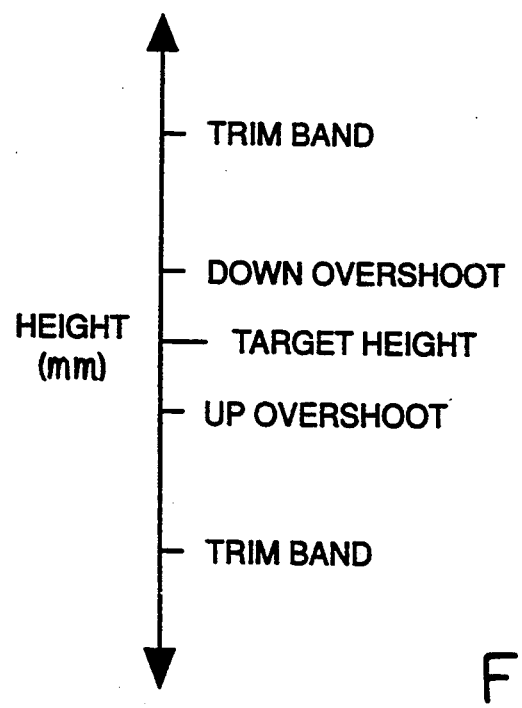
FIG. 10 is a graphical illustration of the relationship between the target height, trim band and overshoot constants utilized by the present invention.

Referring now to FIG. 9, there is shown a state transition diagram illustrating the operating states of the vehicle and the conditions for transition therebetween. In the preferred embodiment, the operating state determines the value of the target vehicle height, trim band and overshoot constants. As shown, there are three states associated with vehicle operation: a Vehicle Stopped state 150, a Suburban Driving state 152 and an Expressway Driving state 154. When the vehicle ignition is first turned on and the vehicle is started, the vehicle is in the Vehicle Stopped state 150. In the Vehicle Stopped state, the target height, trim band and overshoot constants are initialized to the following values:

front target height=0 mm
front trim band=±9 mm
front up overshoot=1 mm
front down overshoot=1 mm
rear target height=0 mm
rear trim band=±9 mm
rear up overshoot=1 mm
rear down overshoot=1 mm The relationship between the target height, trim band and overshoot constants is illustrated in FIG. 10. As shown, the trim band thus creates a range of vehicle heights which dictate when corrections to the vehicle ride height will be initiated. For example, a front trim band of ±9 mm results in a total trim band of 18 mm. For a front ride height correction to be made, the filtered height signal is outside that 18 mm range. Similarly, the up/down overshoot constants create a range around the target height, and are utilized in determining when to stop making a ride height correction. More specifically, the up/down overshoot constants help to assure that the corrected ride height is as close as possible to the target height, taking into consideration the fact that the vehicle height will continue to increase or decrease slightly even after the pneumatic valves are de-energized.

With continuing reference to FIG. 9, when the vehicle speed is increased to at least about 5 MPH, the vehicle state transitions from the Vehicle Stopped state 150 to the Suburban Driving state 152. Accordingly, the trim band and overshoot variables are preferably set to the following values:

front trim band=±6 mm
front up overshoot=1 mm
front down overshoot=3 mm
rear trim band=±9 mm
rear up overshoot=1 mm
rear down overshoot=1 mm Thus, only the front trim band and the front down overshoot variables are modified in the transition from the Vehicle Stopped state 150 to the Suburban Driving state 152. This modification to the front trim band generally results in an increase in the number of corrections made to the front right and front left air springs. This is to reduce the amount of steering pull created by a front side-to-side difference. The overshoot is changed when the vehicle is moving because vent corrections take place at a higher rate. This may be because road inputs reduce suspension friction. All corrections are stopped before trim to allow for "inertial overshoot" of the vehicle's body mass. Due to the possibility for inertial overshoot, the front down overshoot variable is increased to 3 mm in the Suburban Driving state 152. Thus, when a venting correction is being made to the front air springs, the appropriate pneumatic valve will be de-energized when the estimated height signal is 3 mm above the target height.

As shown in FIG. 9, as the vehicle speed is further increased, the Suburban Driving state 152 is exited and the Expressway Driving state 154 is entered. More specifically, the Expressway Driving state 154 is entered when the vehicle speed equals or exceeds 65 MPH or when the vehicle speed equals or exceeds 55 MPH for a period of at least about 30 seconds. In the Expressway Driving state 154, the target height, trim band and overshoot variables are set to the following values:

front target height=−20 mm
front trim band=±6 mm
front up overshoot=1 mm
front down overshoot=3 mm
rear target height=−20 mm
rear trim band=±9 mm
rear up overshoot=1 mm
rear down overshoot=1 mm As can be seen, only the front and rear target heights are changed in the transition from the Suburban Driving state to the Expressway Driving state. The change in the target height to −20 mm implements speed levelling, wherein at specified vehicle speeds (based on the adjusted speed signal), the vehicle is lowered approximately 20 mm to improve vehicle handling, increase stability and reduce aerodynamic drag.

Figure 11:
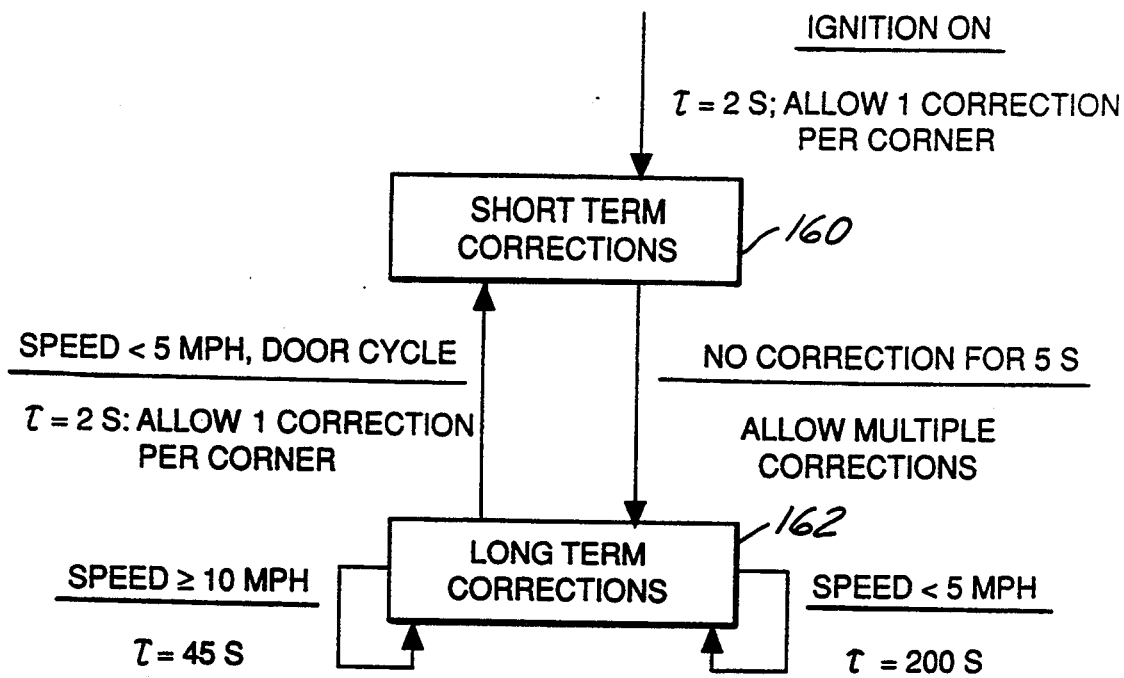
FIG. 11 is a state transition diagram, illustrating the short and long term correction states and the conditions for transition therebetween, the correction state determining which filtered height signal is utilized to make vehicle height correction decisions, based on vehicle speed.

As the vehicle slows down, the vehicle state transitions from the Expressway Driving state 154 back to the Suburban Driving state 152. More specifically, the Suburban Driving state 152 is entered when the vehicle speed drops below 35 MPH, or when the vehicle speed drops below 45 MPH for a period of at least about 30 seconds. Accordingly, the target height, trim band and overshoot variables are set to the following values:

front target height=0
front trim band=±6 mm
front up overshoot=1 mm
front down overshoot=3 mm
rear target height=0
rear trim band=±9 mm
rear up overshoot=1 mm
rear down overshoot=1 mm With continuing reference to FIG. 9, the Vehicle Stopped state 150 is entered from the Suburban Driving state 152 when the vehicle further slows to 0 MPH. Upon return to the Vehicle Stopped state, the target height, trim band and overshoot variables are returned to their initialized values, namely:

front target height=0
front trim band=±9 mm
front up overshoot=1 mm
front down overshoot=1 mm
rear trim band=±9 mm
rear up overshoot=1 mm
rear down overshoot=1 mm Referring now to FIG. 11, there is shown a state transition diagram illustrating the short term and long term correction states and the conditions for transition therebetween. Generally, short term corrections are utilized to correct ride height variations due to quick changes in the load (e.g. passenger entry/exit). Long term corrections, on the other hand, are typically utilized to correct ride height variations occurring over a longer period of time (e.g. fuel burn-off). In the preferred embodiment, the correction state determines which filtered height signal (i.e. long term or short term) is utilized to initiate vehicle height corrections, based on vehicle speed. The arrows illustrate transitions between the states. Alongside each arrow, the condition to be satisfied for each transition is shown (above the line), as is the action taken in response to satisfaction of the condition (below the line).

As shown in FIG. 11, at vehicle start-up, the Short Term Corrections state 160 is entered and the suspension module 14 preferably performs at most only 1 height correction (up or down) per corner, i.e., front left, front right and rear. While in the Short Term Corrections state 160, the adjusted height signal (from summer 126 shown in FIG. 4) is compared to the trim band and overshoot variables to determine when height corrections are necessary. The Short Term Corrections state is exited and the Long Term Corrections state 162 is entered if no corrections occur for 5 seconds.

With continuing reference to FIG. 11, while in the Long Term Corrections state, the long term filtered height signal from the VLPF 140 is compared to the trim band variables to determine the need for vehicle height corrections. Based on vehicle speed, the time constant of the VLPF 140 is varied. For vehicle speeds under 5 MPH, the time constant $\tau$ is about 200 seconds, whereas the time constant has a value of about 45 seconds for vehicle speeds greater than or equal to about 10 MPH, as previously described in greater detail above with reference to FIG. 8. As shown in FIG. 11, if the vehicle speed drops below a value of about 5 MPH, and one of the vehicle doors is cycled (i.e. opened and closed), the Long Term Corrections state 162 is exited and the Short Term Corrections state 160 is re-entered with the time constant set to 2 seconds. A door cycle could a load change and thus a short term correction is desirable. Once in the Short Term Corrections state, the suspension module 14 permits one correction per corner based on the adjusted height signal from the summer 126.

Figure 12:
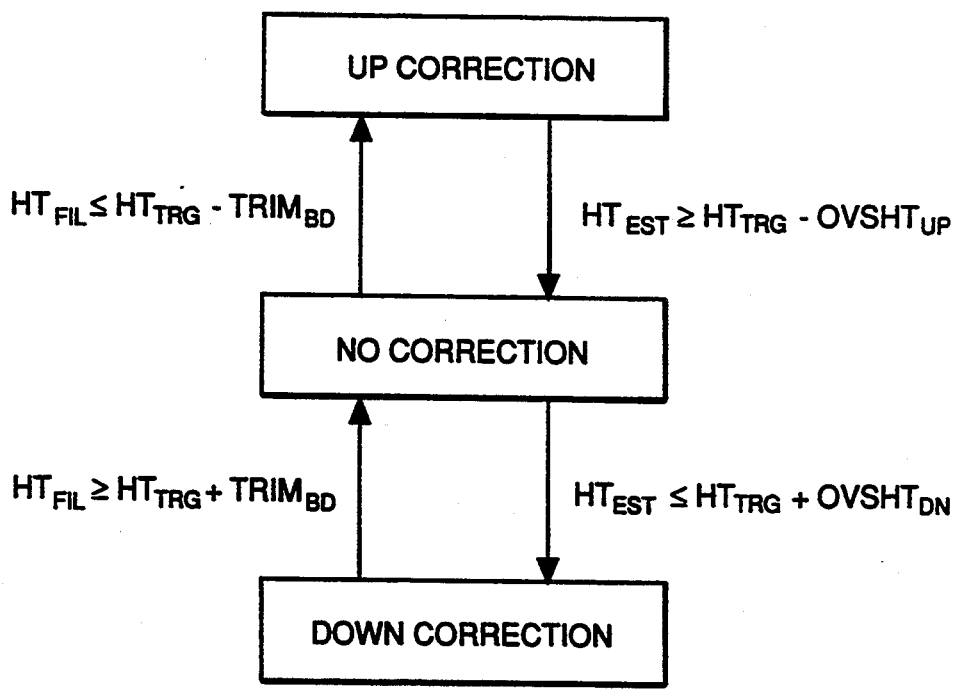
FIG. 12 is a state transition diagram, illustrating the correction request states and the conditions for transition therebetween.

Referring now to FIG. 12, there is shown a state transition diagram illustrating the correction request states for height corrections and the conditions for transitions between the states. In the preferred embodiment, the type of correction (i.e. up or pump, down or vent) to perform, and when to stop the correction, are determined based on the appropriate (i.e. long term or short term) filtered height signal ($HT_{FIL}$), the estimated height signal ($HT_{EST}$) and the target height ($HT_{TRG}$), trim band ($TRIM_{BD}$) and overshoot variables ($OVSHT_{up}$ and $OVSHT_{DN}$). As previously discussed in greater detail with respect to FIG. 11, the filtered height signal is either the adjusted height signal from the summer 126 or the long term filtered height signal from the VLPF 140. As shown in FIG. 12, the filtered height signal is preferably utilized to start height corrections and the estimated height signal from the summer 132 is preferably utilized to stop height corrections. As to priority, up/pump corrections are preferably performed prior to down/vent corrections, and corrections to the front end of the vehicle are made prior to corrections to the rear end of the vehicle. Corrections to the front end can be made separately or together, since there are two front height sensors. That is, each front air spring can be inflated/deflated separately from the other, whereas both rear air springs are preferably inflated or deflated together, since there is only one rear height sensor.

With combined reference to FIGS. 10 and 12, in the preferred embodiment, up and down corrections are commenced when the filtered height signal is outside of the total trim band. Stated algebraically, an up correction is performed when:

$$HT_{FIL} \leq HT_{TRG} = TRIM_{BD}$$

and a down correction is commenced when:

$$HT_{FIL} \geq HT_{TRG} + TRIM_{BD}$$

With continuing reference to FIG. 12, once a height correction is proceeding, the estimated height signal from the summer 132 is utilized to stop the correction. Preferably, corrections are stopped when the estimated height signal is between the target height and the respective overshoot. Stated algebraically, an up correction is stopped when:

$$HT_{EST} \geq HT_{TRG} = OVSHT_{UP}$$

and a down correction is stopped when:

$$HT_{EST} \leq HT_{TRG} + OVSHT_{UP}$$

Figure 13:
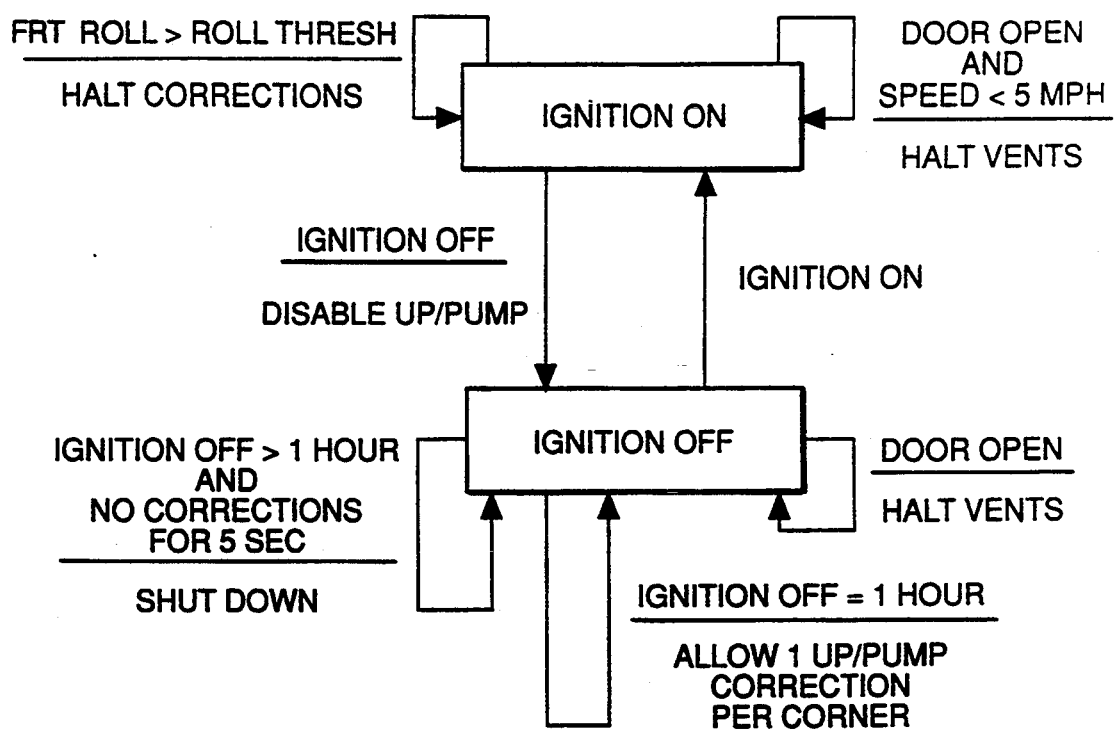
FIG. 13 is a state transition diagram, illustrating the preferred operating states of the suspension module 14 for determining when ride height corrections should be inhibited.

Referring now to FIG. 13, there is shown a state transition diagram illustrating the preferred operating states of the suspension module 14 for determining when ride height corrections should be inhibited. As shown, when the vehicle ignition is switched to the "on" position, the module 14 enters the Ignition On state, and the target height, trim band and overshoot variables are reset to the initialization values discussed above. Once in the Ignition On state, a down/vent correction determined according to FIG. 12 will be halted if either the driver or passenger door sensors detect opening of a door and the vehicle speed is less than about 5 MPH. This strategy prevents the possibility of the vehicle door from being lowered onto a curb.

With continuing reference to FIG. 13, when in the Ignition On state, all corrections are halted if the vehicle is in a roll condition, i.e. $FRT_{ROLL}$ exceeds the roll threshold. Since ride height corrections made during a roll condition would likely result in an unlevel vehicle after the roll condition subsides, this strategy prevents unnecessary corrections from being made and prevents the accompanying objectionable steering pull. When the ignition is switched to the "off" position, the Ignition Off state is entered. Once in the Ignition off state, the module 14 remains active for a predetermined time period, such as about one hour, during which certain ride height corrections can be made. This is mainly to allow the corners to go down/vent after passenger exit and loads are removed while the key is in the 'off' position. In the preferred embodiment, any corrections in process when the ignition is switched off are completed. Thereafter, up/pump corrections are disabled, so as to preserve the vehicle battery.

While in the Ignition Off state, down/vent corrections are preferably halted if a vehicle door is opened. After the one hour period has elapsed, the module 14 preferably allows one final up/pump correction to be made at each corner, if necessary. Once the hour has elapsed and there have been no final corrections for about 5 seconds, the suspension module 14 is powered down.

It is understood that while the form of the invention herein shown and described constitutes the preferred embodiment of the invention, it is not intended to illustrate all possible forms thereof. It will also be understood that the words used are words of description rather than limitation, and that various changes may be made without departing from the spirit and scope of the invention as disclosed.

We claim:

1. A method for controlling vehicle ride height for use with a vehicle travelling on a road surface, the vehicle having a body, front and rear wheels and an air suspension, the method comprising:
   (a) sensing vehicle body height relative to the wheels to obtain front and rear vehicle height signals, and sensing vehicle speed to obtain a vehicle speed signal;
   (b) determining a natural lean of the vehicle based on the front height signals, natural lean of the vehicle representative of one side of the vehicle being higher or lower than the other side of the vehicle;
   (c) processing the front height signals to obtain a vehicle roll signal that has been compensated for the natural lean of the vehicle, the vehicle roll signal indicating vehicle roll due to steering adjustments by the vehicle operator;
   (d) processing the vehicle speed signal to obtain a vehicle pitch offset signal, the vehicle pitch offset signal indicating vehicle height change due to longitudinal vehicle accelerations; and
   (e) adjusting the height of the vehicle toward a predetermined target ride height based on the height signals, the vehicle roll signal and the vehicle pitch offset signal.

2. The method of claim 1 further comprising:
   (f) filtering the vehicle height signals to remove road inputs due to variations in the road surface to obtain filtered height signals, the filtered height signals lagging the vehicle height signals;
   (g) determining an adjusted vehicle height signal based on the filtered height signals, the vehicle roll signal and the pitch offset signal;
   (h) compensating the adjusted vehicle height signal for the filtering lag introduced by step (f), to obtain a compensated height signal indicating the actual change in vehicle ride height; and
   (i) adjusting the ride height of the vehicle toward the predetermined target ride height based on the compensated height signal, thereby increasing the accuracy with which vehicle ride height adjustments are made and reducing the time required to initiate the adjustments.

3. The method of claim 1 further comprising:
   (j) filtering the vehicle speed signal to obtain a filtered vehicle speed signal, the filtered vehicle speed signal lagging the vehicle speed signal;
   (k) filtering the filtered vehicle speed signal to obtain a vehicle acceleration signal;
   (l) compensating the filtered vehicle speed signal for the filtering lag introduced by step (j), to obtain an adjusted vehicle speed signal; and
   (m) adjusting the ride height of the vehicle when the vehicle attains a predetermined speed, as indicated by the adjusted vehicle speed signal.

4. The method of claim 1 wherein the natural lean of the vehicle is determined based on the vehicle speed and the difference between the height signals corresponding to the right front wheel and the left front wheel ($FRT_\Delta$).

5. The method of claim 4 further comprising filtering $FRT_\Delta$ with a filter having a variable time constant, the time constant varying based on vehicle speed.

6. The method of claim 5 wherein the time constant also varies based on the sign and magnitude of $FRT_\Delta$ and the natural lean of the vehicle.

7. The method of claim 1 further comprising the step of halting adjustments to the vehicle ride height if the vehicle is in an excessive roll condition, the vehicle being in an excessive roll condition if the vehicle roll signal exceeds a predetermined roll threshold, which varies based on vehicle speed.

8. The method of claim 1 wherein the step of processing the vehicle speed signal to obtain a vehicle pitch offset signal includes processing the vehicle speed signal to obtain vehicle acceleration and vehicle dynamic pitch response.

9. The method of claim 1 wherein the step of processing the front height signals to obtain a vehicle roll signal includes processing the front height signals to obtain filtered left front and right front height signals and a filtered front height difference signal representative of the difference between the left front filtered height signal and the right front filtered height signal.

10. A method for controlling vehicle ride height for use with a vehicle travelling on a road surface, the vehicle having a body, front and rear wheels and an air suspension, the method comprising:
    (a) sensing vehicle body height relative to the wheels to obtain front and rear vehicle height signals, and sensing vehicle speed to obtain a vehicle speed signal;
    (b) determining a natural lean of the vehicle based on the front height signals, the natural lean of the vehicle representative of one side of the vehicle being higher or lower than the other side of the vehicle;
    (c) filtering the vehicle height signals to remove road inputs due to variations in the road surface to obtain filtered height signals, the filtered height signals lagging the vehicle height signals;
    (d) processing the front height signals to obtain a vehicle roll signal that has been compensated for the natural lean of the vehicle, the vehicle roll signal indicating vehicle roll due to steering adjustments by the vehicle operator;
    (e) processing the vehicle speed signal to obtain a vehicle pitch offset signal, the vehicle pitch offset signal indicating vehicle height change due to vehicle longitudinal accelerations;
    (f) determining an adjusted vehicle height signal based on the filtered height signals, the vehicle roll signal and the pitch offset signal;
    (g) compensating the adjusted vehicle height signal for the filtering lag introduced by step (c), to obtain a compensated height signal indicating the actual change in vehicle ride height; and
    (h) adjusting the height of the vehicle toward a predetermined target ride height based on the compensated height signal, thereby increasing the speed and accuracy with which vehicle ride height adjustments are made.

11. The method of claim 10 further comprising:

(i) filtering the vehicle speed signal to obtain a filtered vehicle speed signal, the filtered vehicle speed signal lagging the vehicle speed signal;

(j) filtering the filtered vehicle speed signal to obtain a vehicle acceleration signal;

(k) compensating the filtered vehicle speed signal for the filtering lag introduced by step (i), to obtain an adjusted vehicle speed signal; and (l) adjusting the ride height of the vehicle when the vehicle attains a predetermined speed, as indicated by the adjusted vehicle speed signal.

12. The method of claim 10 wherein the natural lean of the vehicle is determined based on the vehicle speed and the difference between the height signals associated with the right front wheel and the left front wheel ($FRT_\Delta$).

13. The method of claim 12 further comprising filtering $FRT_\Delta$ with a filter having a variable time constant, the time constant varying based on vehicle speed.

14. The method of claim 13 wherein the time constant also varies based on the sign and magnitude of $FRT_\Delta$ and the natural lean of the vehicle.

15. The method of claim 9 further comprising the step of halting adjustments to the vehicle ride height if the vehicle is in an excessive roll condition, the vehicle being in an excessive roll condition if the vehicle roll signal exceeds a predetermined roll threshold, which varies based on vehicle speed.

16. The method of claim 10 wherein the step of processing the vehicle speed signal to obtain a vehicle pitch offset signal includes processing the vehicle speed signal to obtain vehicle acceleration and vehicle dynamic pitch response.

17. An apparatus for controlling vehicle ride height for use with a vehicle travelling on a road surface, the vehicle having a body, front and rear wheels and an air suspension, the apparatus comprising:

means for sensing vehicle body height relative to the wheels to obtain front and rear vehicle height signals, and sensing vehicle speed to obtain a vehicle speed signal;

means for determining a natural lean of the vehicle based on the front height signals, the natural lean of the vehicle representative of one side of the vehicle being higher or lower than the other side of the vehicle;

low pass filter means for filtering the vehicle height signals to remove road inputs due to variations in the road surface to obtain filtered height signals, the filtered height signals lagging the vehicle height signals;

filter means for processing the front height signals to obtain a vehicle roll signal that has been compensated for the natural lean of the vehicle, the vehicle roll signal indicating vehicle roll due to steering adjustments by the vehicle operator;

filter means for processing the vehicle speed signal to obtain a vehicle pitch offset signal, the vehicle pitch offset signal indicating vehicle height change due to vehicle longitudinal accelerations;

means for determining an adjusted vehicle height signal based on the filtered height signals, the vehicle roll signal and the pitch offset signal;

means for compensating the adjusted vehicle height signal for filtering lag introduced by the low pass filter means, to obtain a compensated height signal indicating the actual change in vehicle ride height; and means for adjusting the height of the vehicle toward a predetermined target ride height based on the compensated height signal, thereby increasing the speed and accuracy with which vehicle ride height adjustments are made.

18. The apparatus of claim 17 further comprising:

low pass filter means for filtering the vehicle speed signal to obtain a filtered vehicle speed signal, the filtered vehicle speed signal lagging the vehicle speed signal;

high pass filter means for filtering the filtered vehicle speed signal to obtain a vehicle acceleration signal;

means for compensating the filtered vehicle speed signal for filtering lag introduced by the low pass filter means, to obtain an adjusted vehicle speed signal; and means for adjusting the ride height of the vehicle when the vehicle attains a predetermined speed, as indicated by the adjusted vehicle speed signal.

19. The apparatus of claim 17 wherein the filter means for processing the vehicle speed signal to obtain a vehicle pitch offset signal includes high pass filter means for processing the vehicle speed signal to obtain vehicle acceleration and low pass filter means for processing the vehicle speed signal to obtain vehicle dynamic pitch response.

* * * * *